(12) United States Patent
Perry (10) Patent No.: US 8,640,626 B2
(45) Date of Patent: Feb. 4, 2014

(54) RAMP SYSTEM FOR BRIDGING FLEXIBLE CABLE TO RIGID RAIL

(71) Applicant: Donald Perry, Branchport, NY (US)

(72) Inventor: Donald Perry, Branchport, NY (US)

(*) Notice: Subject to any disclaimer, the term of this patent is extended or adjusted under 35 U.S.C. 154(b) by 0 days.

(21) Appl. No.: 13/677,400

(22) Filed: Nov. 15, 2012

(65) Prior Publication Data

US 2013/0125776 A1    May 23, 2013

Related U.S. Application Data

(60) Provisional application No. 61/561,025, filed on Nov. 17, 2011.

(51) Int. Cl.
    *B61B 15/00*            (2006.01)

(52) U.S. Cl.
    USPC ................................................ 104/87; 472/49

(58) Field of Classification Search
    USPC .............. 104/87, 112, 113, 115, 53; 105/148, 105/150; 472/131, 133, 50
    See application file for complete search history.

(56) References Cited

U.S. PATENT DOCUMENTS

| | | | | |
|---|---|---|---|---|
| 1,571,096 A | * | 1/1926 | Rambin et al. | 182/11 |
| 2,198,536 A | * | 4/1940 | Lloyd et al. | 104/87 |
| 6,427,601 B2 | * | 8/2002 | Albrich | 104/87 |
| 6,666,773 B1 | * | 12/2003 | Richardson | 472/49 |
| 7,381,137 B2 | * | 6/2008 | Steele et al. | 472/45 |
| 7,823,511 B2 | * | 11/2010 | Lins et al. | 104/127 |
| 8,166,885 B2 | * | 5/2012 | Kitchen | 104/189 |
| 8,499,696 B2 | * | 8/2013 | Tilley | 104/87 |
| 2002/0162477 A1 | * | 11/2002 | Palumbo | 104/87 |
| 2006/0027134 A1 | * | 2/2006 | Steele et al. | 104/113 |
| 2009/0266267 A1 | * | 10/2009 | Moss | 104/53 |
| 2011/0083577 A1 | * | 4/2011 | Tilley | 104/96 |
| 2012/0090494 A1 | * | 4/2012 | Beck | 104/87 |
| 2013/0098260 A1 | * | 4/2013 | Creissels et al. | 104/87 |

* cited by examiner

*Primary Examiner* — Jason C Smith
(74) *Attorney, Agent, or Firm* — Tracy Jong Law Firm; Tracy P. Jong; Cheng Ning Jong (57) ABSTRACT

A ramp system for bridging a flexible cable to a rigid rail to improve the movement of a trolley along a low tension fixed aerial cableway. The ramp system has an inverted U-shaped elongated channel having a contact surface, a proximal end and a distal end, wherein the distal end is disposed atop and contacts a portion of the cableway and an anchor configured to pivotably support the proximal end of the channel at a second point at a second level. The second level is disposed higher than the first level, wherein the distal end of the channel is slideably but positively secured to the portion of the cable and the first point, second point and distal end cooperate to form a triangular relationship, thereby reducing bending in the cable, reducing the approach angle and fatigue exerted on the channel and cable.

20 Claims, 11 Drawing Sheets

RAMP SYSTEM FOR BRIDGING FLEXIBLE CABLE TO RIGID RAIL

PRIORITY CLAIM AND RELATED APPLICATIONS

This non-provisional application claims the benefit of priority from provisional application U.S. Ser. No. 61/561,025 filed on Nov. 17, 2011. Said application is incorporated by reference in its entirety.

BACKGROUND OF THE INVENTION

1. The Field of the Invention

The present invention is directed generally to a ramp system. More specifically, the present invention is directed to a ramp system leading from a flexible cableway to a rigid rail to enable the movement of persons or goods to and from the cableway by means of a self-propelled trolley.

2. Background Art

U.S. Pat. No. 2,198,536 to Johansen et al. teaches a moveable rail configured to smooth the transition between a flexible cableway and a rigid rail. The ramp, however, was of the same hardness as the cableway and therefore repeated trolley passage on the ramp rubbed the cable leading to abrasion of the cable. Also, the ramp lacked a surface modification that would allow a trolley to climb a steeper angle.

This was not a problem in the prior art since the cableway was a high tension cableway where the approach angle tended to be small, i.e., less than 3 degrees. However, where there is a cableway having low tension, there would be larger sag which in turn would result in a greater approach angle for any given load. This approach angle is greatest near to the connection with the rail support. An additional complication with a low tension cableway is that a self-propelled trolley moves due to contact of the drive wheel with the cable. When the ramp is steep and/or wet, the drive wheel may lose traction and the trolley will not climb the grade.

Elevated rail systems of one or more rails are expensive to install, since the catenary nature of suspended cables makes trolley movement along them difficult due to the rising and falling of the cableway between supports. In order to overcome this, one can employ a high tension cableway as used in banana trams or an overhead support cable that holds the rail system and its cable in about a linear or contra-catenary path. In both cases, the line support cable causes a supported cable to be more linear and allows smooth transitions from spans to supports. A problem with the high tension cableway is that it needs exponentially larger numbers of supports as the load increases.

Thus, there arises a need for a mechanism which enables the use of low tension cable with self-propelled trolleys.

SUMMARY OF THE INVENTION

The present invention is directed toward a ramp system for reducing an approach angle of one end of a simply supported low tension cable at a first point at a first level. The ramp system comprises an inverted U-shaped elongated channel having a contact surface, a proximal end and a distal end. The distal end is disposed atop and contacts a portion of the low tension cable. The ramp system further comprises an anchor configured to pivotably support the second end of the channel at a second point at a second level where the second level is disposed higher than the first level. The distal end of the channel is slideably but positively secured to the portion of the cable coming in contact with the distal end of the channel. The first point, second point and distal end cooperate to form a triangular relationship, thereby reducing bending in the cable, reducing the approach angle and reducing fatigue experienced by the channel and the cable.

There is further disclosed an anti-wobble device comprising a stabilizer block and an elongated bar having a first pivot point and a second end. The stabilizer block includes a block having a groove centrally disposed about a surface of the block and between two outer surfaces. The elongated bar is rotatably secured at the first pivot point and the stabilizer block is secured to the second end such that the groove of the drive wheel is configured to maintain rolling contact with the low tension cable or the elongated channel at any time. The elongated bar is configured to rotate about the first pivot point such that the stabilizer block is configured to slidingly engage the low tension cable at the groove and the stabilizer block is configured to slidingly engage the ramp system at the two outer surfaces.

Accordingly, it is a primary object of the present invention to provide a ramp system which reduces an approach angle of one end of a cable with respect to the support of the cable end.

It is a further object of the present invention to provide a ramp system which reduces fatigue and abrasions experienced by a cable as a result of using a self propelled trolley on the cable.

It is a further object of the present invention to provide an anti-wobble device which aids in stabilizing the travel of a trolley used on the present ramp system.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—ramp system
4—support
5—high tension cable
6—low tension cable
8—base
10—drive wheel
12—trolley
14—user
16—intermediate support
18—rigid transfer rail
20—inverted U-shaped channel
22—cable securing point
24—channel attachment point
26—cable attachment point
28—cable end
30—starter ramp
32—clamp
34—contact surface of channel
36—thimble
38—approach angle of channel
40—approach angle of channel with starter ramp
42—horizontal distance between cable and ramp attachment points
44—vertical distance between cable and ramp attachment points
46—vertical distance between contact surface of channel and cable securing point
48—horizontal distance between one longitudinal edge of contact surface of channel and cable securing point
50—length of channel
52—height of channel
54—width of channel
56—approach angle of high tension cable
58—approach angle of low tension cable
60—cable support
62—Inverted V-shaped channel
64—ledge for preventing trolley derailment and locking trolley to ramp and rail
66—bottom wall of channel
68—opening in bottom wall of channel
70—anti-wobble device
72—arm connecting anti-wobble wheel
74—anti-wobble wheel
76—pivot point about which anti-wobble wheel rotates
78—pivot point about which anti-wobble device rotates
80—axle
82—groove of drive wheel
84—side wall of channel
86—side wall of drive wheel
88—frame securing a drive wheel to a trolley
90—U-shaped channel
92—hook
94—outer surface of sheave
96—groove of sheave
98—stabilizer block
100—groove of stabilizer block
102, 104—direction of wobble
106—trolley rotational direction
108—secondary groove for accommodating cable
110—contact point of edge of opening with cable
112—slanted surface
114—tension spring
116—outer surface of stabilizer block

PARTICULAR ADVANTAGES OF THE INVENTION

The present invention improves a low tension or high tension cable configuration by making the channel's distal contact point from a material having a lower measure of hardness, thereby greatly improving cable life as repeated rubbing between the ramp and cable can lead to wearing of the distal end of the channel.

The present ramp system serves a different function than the prior art. The rope tramway of '536 was designed to reduce the "beating of the cable" by the trolley when passing in either direction on the ramp and flexible cable. The present ramp system is designed to reduce the angle of approach to the support and eliminate the steepest portion of the rise and smooth the transition to the rail.

In one embodiment, the present ramp system is configured with a modified coefficient of friction between the drive wheel and channel by modifying the contact surface of the ramp and/or the outer surface of a drive wheel configured to ride on the contact surface of the channel. The channel includes a contact surface that improves the grip with the drive wheel. The drive wheel itself may also have similar improvements.

By using low tension cables, long spans with high loads are avoided, although these can technically be achieved with massive anchors and large diameter cables. In comparison, low tension cableways are very attractive since they can hold much larger loads with much less massive anchors and smaller cable diameters. However, as smaller and low tension cables are used, the angle of approach to the support increases. The steepness of the cable is greatest near to the support while a load is placed on the cable. An increase in approach angle to the support is detrimental for a number of reasons. In a configuration where the trolley is self propelled, the traction of the wheel on the cable depends on the coefficient of friction between the wheel and cable. However, the steeper the approach angle, the greater the coeficient of friction must be available for the vehicle to climb the progressively steeper approach angle. Further, an increase in grade will also necessitate an increase in lifting power of the vehicle. Power, tire wear and cable wear are reduced by employing a relatively long rail that reduces the approach angle near the support. The present ramp system modifies the approach angle of a low tension cable to be less steep in an effort to reduce the required support strength and the cable diameter.

Another feature of the present ramp system lies in its ability to reduce the bending and abrasion to the cable that reduces its useful life. This is achieved by having a channel whose contact surface is less hard than the cable with which it abuts. Thus, wear is primarily imparted on the channel or an end of the channel which can be easily replaced at lower cost and labor than replacing the cable. The channel may be wholly formed from a less hard material and/or have a detached or affixed end that rides on the cable. Given that the curvature of the cable may vary in practice, it is advantageous for the channel end to not be rigidly affixed to the cable. This allows a contact surface of channel to slide with respect to the cable, thereby minimizing bending of the cable. Bending of the cable leads to fatigue and ultimately failure. Bending of the cable is also minimized by not rigidly connecting the cable to the support. Instead, the cable is simply supported at each of its ends. Freedom of movement is allowed by connecting the cable within a thimble which is held to the support by a bolt or via other securing means.

The present ramp system is configured to hold a cable end non-rigidly and therefore does not cause the cable to bend in the vicinity of its attachment point to a support, thereby increasing cable life.

There is further provided an anti-wobble device configured to be used with the trolley. Such device prevents or reduces the amount of wobble a trolley experiences in the trolley's travel direction and in a direction transverse to the trolley's travel direction.

In one embodiment, there is further provided a ledge disposed on at least a portion of a channel of the ramp system. Such ledge is configured to be engaged with a lock disposed on the frame of a trolley to prevent accidental dislodgement of the trolley.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
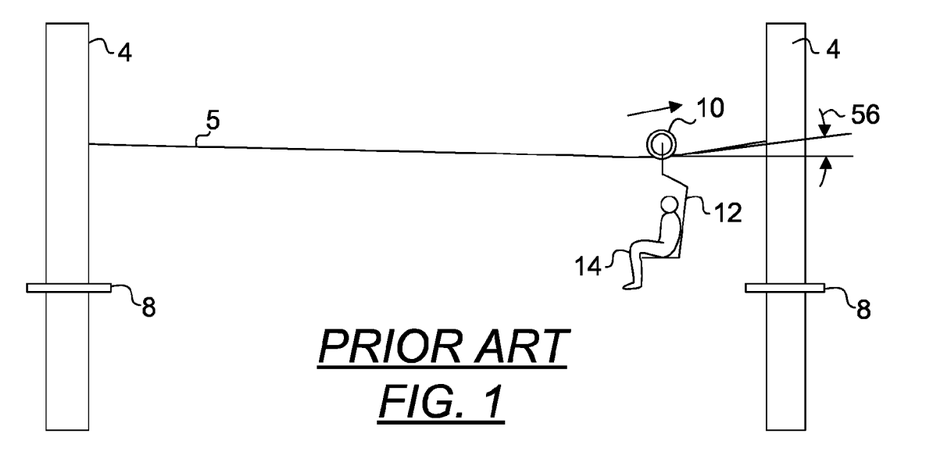
FIG. 1 is a diagram depicting the prior art use of a high tension cable simply supported at its ends using a support on each end.

FIG. 1 is a diagram depicting the prior art use of a high tension cable 5 simply supported at its ends using a support 4 on each end. The cable 5 is spanned between two supports 4 and simply supported at each end with a support 4. The cable 5 is configured for use with a trolley 12 having a drive wheel 10 which comes in contact with and rides on the cable 5.

Figure 2:
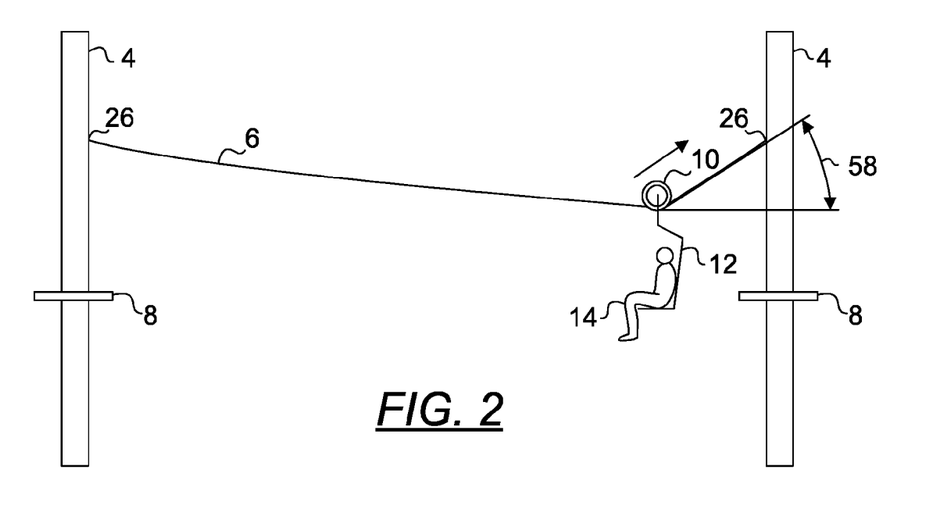
FIG. 2 is a diagram depicting the use of a low tension cable simply supported at its ends using a support on each end.
Figure 3:
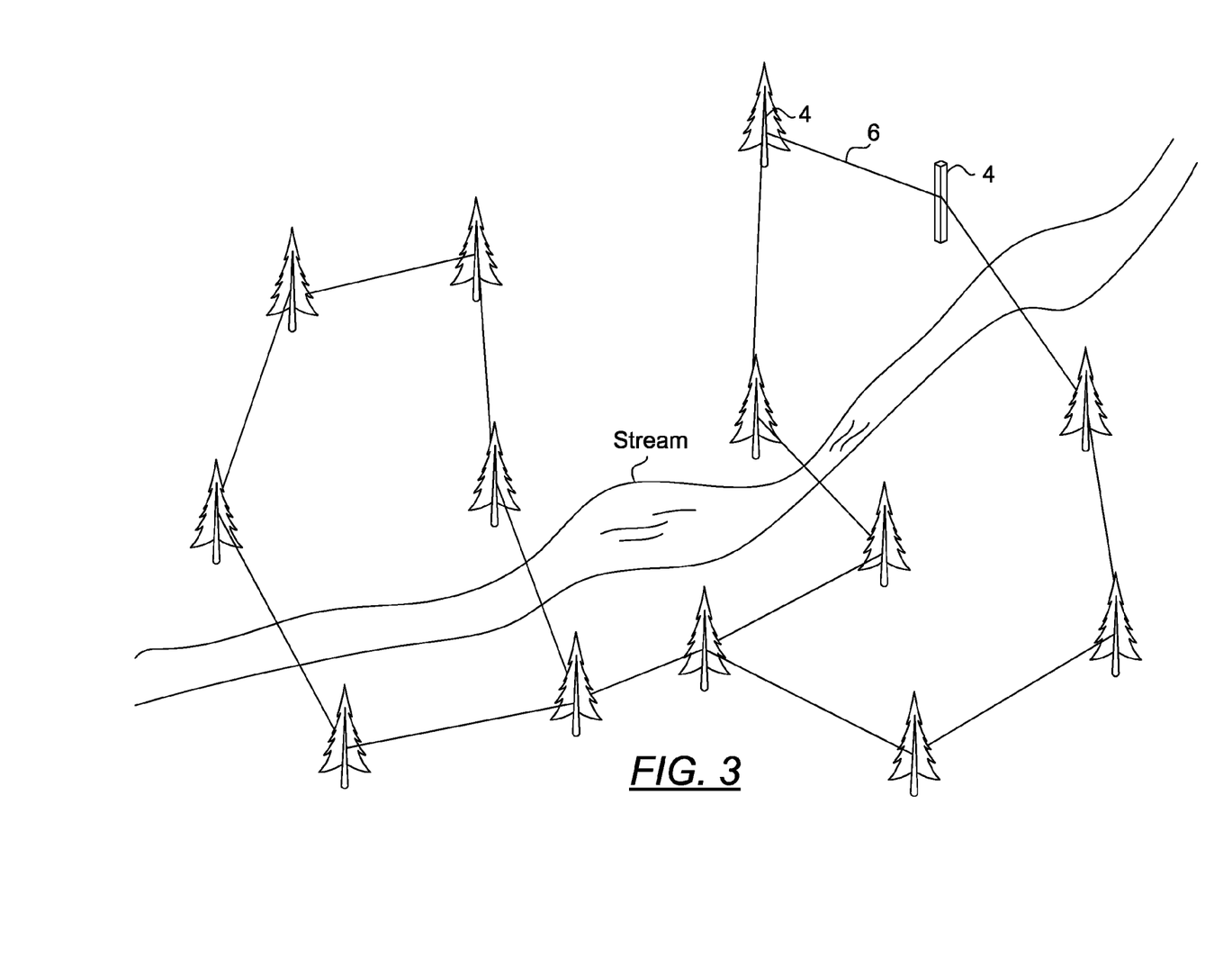
FIG. 3 is a diagram depicting a network of cables connecting various erected structures.

FIG. 2 is a diagram depicting the use of a low tension cable 6 simply supported at each end using a support 4. FIG. 3 is a diagram depicting a network of cables connecting various erected structures (trees and man-made structures). As used herein, a low tension cable is a cable configured for use in applications wherein the cable tension results in an approach angle exceeding 3 degrees. A low tension cable is typically smaller in diameter and lighter than a comparable high tension cable as the low tension cable is designed to carry a smaller load than the high tension cable. In the ensuing discussions, it is assumed that the elevation difference between two consecutive cable attachment points 26 is minimal, or put simply, a low tension cable system is not preferred for use in climbing steep slopes.

As depicted, approach angle 58 of the low tension cable 6 is considerably larger than the approach angle 56 of the high tension cable 5 as the low tension cable 6 sags more significantly than the high tension cable 5 as the weight of a trolley 12 and its user 14 approaches a support 4. A large approach angle causes the drive wheel 10 of the trolley 12 to slip and higher power consumption as the trolley is required to climb a steeper slope. The approach angle of a trolley 12 along a cableway increases trigonometrically as the trolley 12 approaches the point where the cable 5, 6 is simply supported. In one aspect, the support 4 is a tree. In other aspects, the support 4 can be any man-made or other natural structures. The path along a low tension cableway is a succession of rises and falls as a trolley passes over successive supports. The steepest portion of the path is closest to the support.

The present ramp system reduces the steep rise near the support. It is often advantageous for the cable tension to be low as this reduces construction costs associated with the size of cables, and supports required. However, the lower the tension, the steeper the angle of approach to the support becomes. A self-propelled trolley may lose traction and not be able to climb a steep grade. High tension cable requires the use of more massive supports or cables than a low tension cable for proper and safe retention of the cable. A platform 8 may be disposed at each support 4 to facilitate the movement of a user 14.

Figure 4:
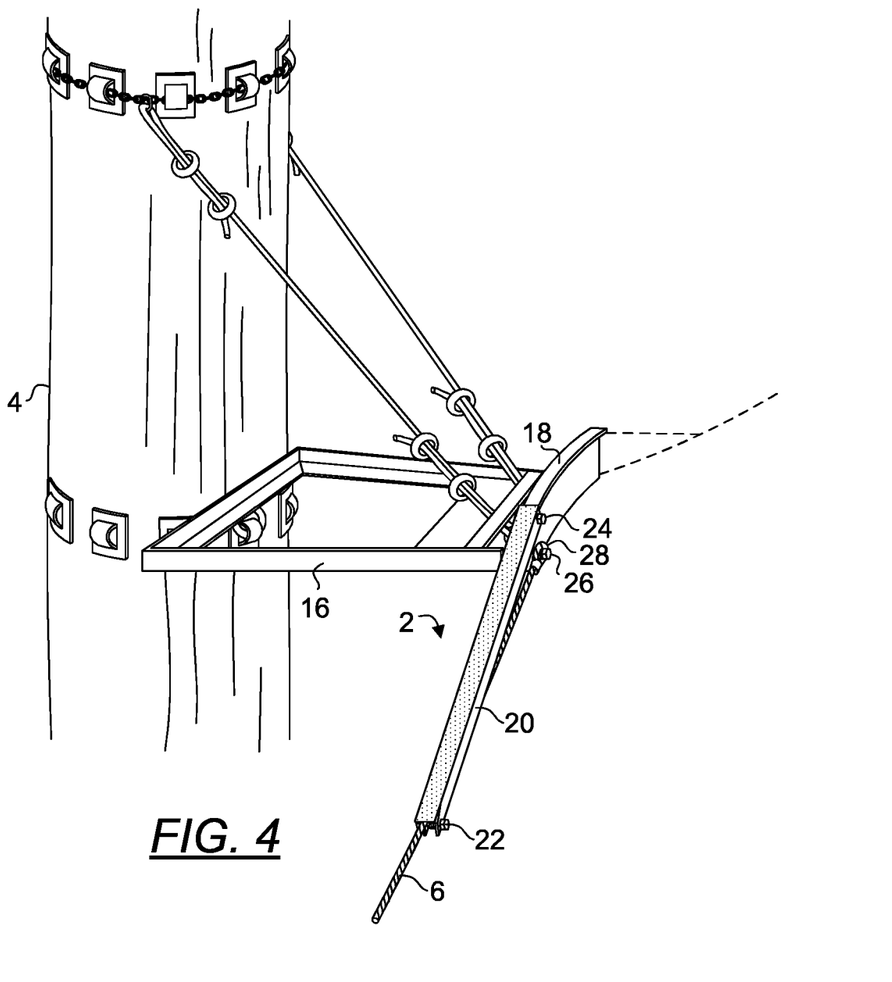
FIG. 4 is a top perspective view of a ramp system of the present invention configured for use with a rigid rail supported on a tree.
Figure 5:
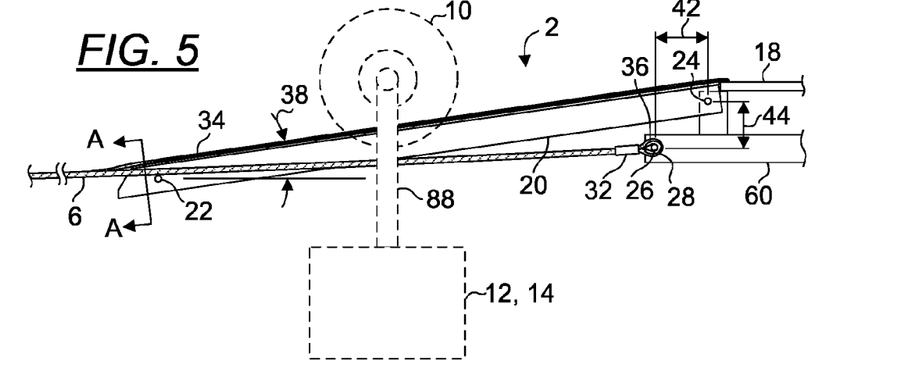
FIG. 5 is a side orthogonal view of a ramp system according to the present invention.
Figure 6:
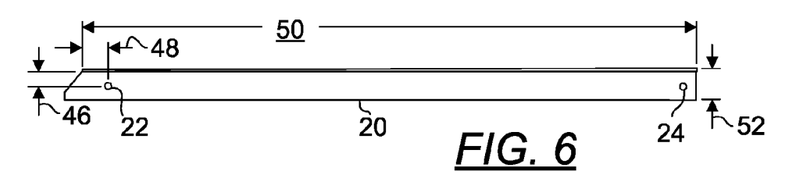
FIG. 6 is a side orthogonal view of an inverted U-shaped channel according to the present invention.
Figure 7:
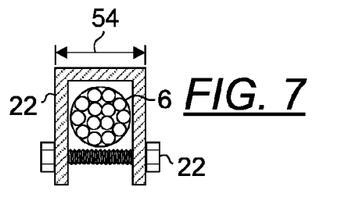
FIG. 7 is a front orthogonal sectional view of the inverted U-shaped channel as taken from line A-A of FIG. 5.
Figure 7A:
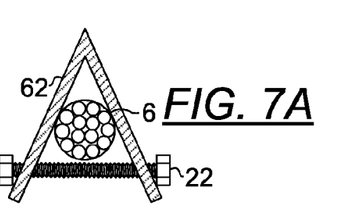
FIG. 7A is a front orthogonal sectional view of an inverted V-shaped channel.

FIG. 4 is a top perspective view of a ramp system 2 of the present invention configured for use with a rigid transfer rail 18 supported on a tree. FIG. 5 is a side orthogonal view of a ramp system according to the present invention. FIG. 6 is a side orthogonal view of an inverted U-shaped channel according to the present invention. FIG. 7 is a front orthogonal view of the inverted U-shaped channel as taken along line A-A of FIG. 5. An intermediate support 16 is essentially a frame secured to a support 4 to create an offset from the support 4 such that a trolley can be used with the cable 6 without interfering with the support 4. In one embodiment, the transfer rail 18 is a straight rail section. In another embodiment, the transfer rail 18 is a curved rail section for causing a change in direction from one cable section to another. The ramp system 2 is configured to reduce an approach angle of one end of a simply supported low tension cable 6 at a cable attachment point 26 disposed at a first level. The term "simply supported" as used herein, defines the means by which the cable is supported where each end of the cable is simply hung at a support 4. In another embodiment as shown in FIG. 7A, an inverted V-shaped channel 62 is depicted. A complementarily shaped drive wheel must be used such that its groove meshes with the exposed surfaces of the V-shaped channel 62.

The ramp system 2 comprises an inverted U-shaped elongated channel having a contact surface, a proximal end and a distal end. The distal end is disposed atop and contacts a portion of the cable 6. The ramp system 2 further comprises an anchor configured to pivotably support the proximal end of the channel at a channel attachment point 24 disposed at a second level. The second level is disposed higher than the first level. The distal end of the channel is slideably but positively secured at cable securing point 22 to the portion of the cable coming in contact with the channel. In one embodiment not shown, a Teflon sleeve is disposed around the cable at the cable securing point 22 to avoid abrasions caused in the cable 6 of the distal end of the channel 20. The first point, second point and distal end cooperate to form a triangular relationship, thereby reducing bending in the cable 6 as a trolley rides on the contact surface 34 of the channel. The approach angle and fatigue experienced by the channel 20 and the cable 6 are also reduced. Referring to FIG. 7, the cable 6 is positively secured within the channel's cavity at cable securing point 22 using a screw and nut combination, rivet or other suitable fastening devices disposed across the channel opening. As the cable 6 is free to slide with respect to the channel 20, cable abrasion is minimized. In order to mitigate slippage of the drive wheel 10, the contact surface 34 of channel 20 or the drive wheel 10 may include patterning, applied material to increase friction between the drive wheel 10 and the channel 20 that allows the trolley 12 to climb steeper angles.

The contact surface 34 of the channel 20 which comes in contact with the drive wheel 10 is preferably constructed from materials, e.g., aluminum, polyurethane, polyethylene, bonded rubber, epoxy and sand mixture or other suitable materials for providing sufficient grip the drive wheel 10. The channel is preferably constructed from materials, e.g., steel and other suitable substrates capable of supporting a trolley 12 and a user 14. The contact surface 34 may be prepared separately and then simply laid over and secured to the contact surface 34 of channel 20. A material may alternatively be sprayed and cured onto the contact surface 34 of channel 20. The channel or the distal end of the channel which comes in contact with a portion of the cable is preferably constructed from a material having a lower hardness index than the cable 6 for reducing the amount of abrasion caused by the channel 20 to the cable 6. The length of the channel is configured such that it leads to a satisfactory reduction in approach angle 38.

In one embodiment, the approach angle 38 is reduced to about 15 degrees as the weight of the trolley 12 and its user 14 is disposed substantially at the distal end of the channel. This angle 38 is further reduced as the weight of the trolley 12 and its user 14 approaches the proximal end of the channel. In contrast, the approach angle of the cable 6 to the support 60 can be in excess of 30 degrees if the present ramp system is not employed. In a cableway, the approach angle is the steepest at a point adjacent a support of the cable. It is advantageous for the channel contact portion of the cable to be slideable with respect to the channel in order to distribute the weight of the trolley over a larger surface along the cable to reduce bending of the cable. Additionally, successive passage of trolleys causes the cable to be repeatedly bent if the distal end of the channel 20 is fixedly attached to the support 4. Bending of the cable is alleviated by forming an eyelet with a clamp 32 at the cable end 28, disposing a thimble 36 within the cable end 28 and securing the eyelet with fastener to the intermediate support 16. Such attachment of the eyelet allows movement of the cable without bending, thereby increasing the life span of the cable.

Figure 8:
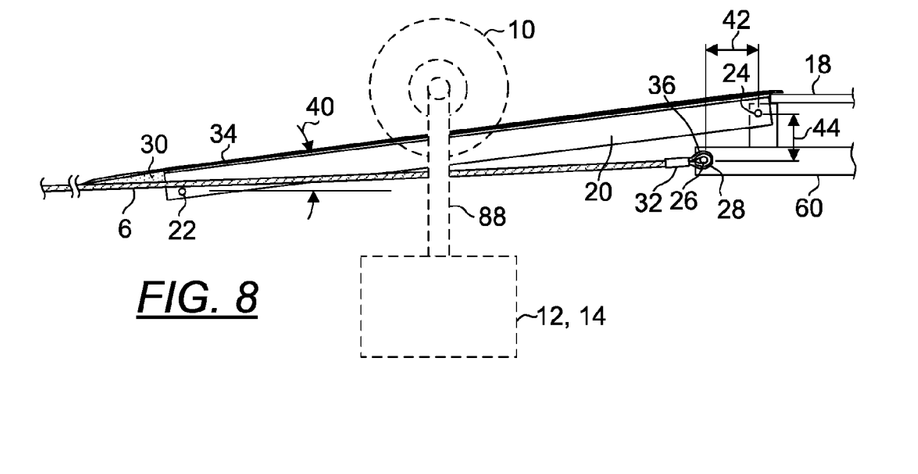
FIG. 8 is a side orthogonal view of another embodiment of a ramp system according to the present invention.

FIG. 8 is a side orthogonal view of another embodiment of a ramp system 2 according to the present invention. In this embodiment, a starter ramp 30 is disposed at the distal end of the channel to further reduce the approach angle 40. The starter ramp 30 is configured such that while attached for use with the channel 20, its contact surface includes a slope similar to the slope of the scontact surface 34 of the channel 20. The starter ramp 30 is preferably constructed from a material having a lower hardness index than the cable 6 for reducing the amount of abrasion caused by the channel 20 to the cable 6 and it is configured to be removably attached to the distal end of the channel 20. As such, the starter ramp 30 is utilized as a consumable which can be replaced when worn, thereby sparing the expenses incurred in replacing the cable 6 or the channel 20.

Figure 9:
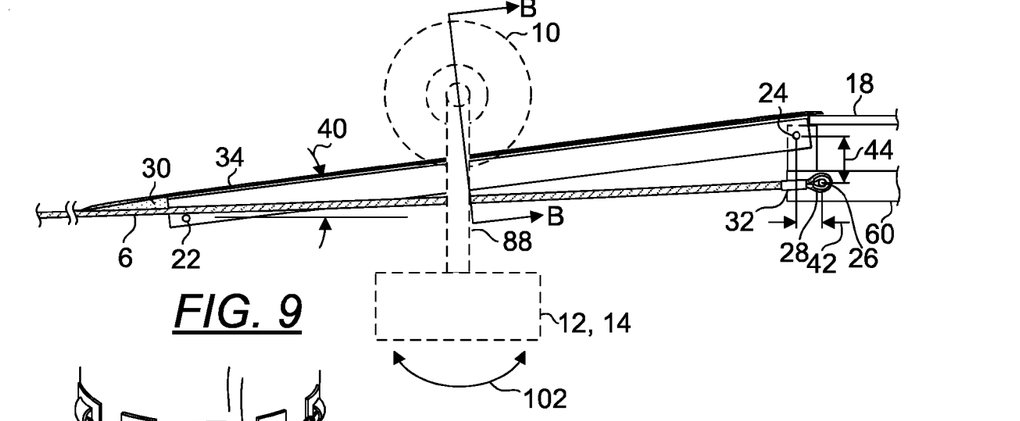
FIG. 9 is a side orthogonal view of yet another embodiment of a ramp system according to the present invention.

FIG. 9 is a side orthogonal view of yet another embodiment of a ramp system 2 according to the present invention. Unlike the ramp system configuration of FIG. 8, the channel 20 of FIG. 9 does not run the risk of coming in contact with cable support 60 as the channel attachment point 24 is horizontally disposed between the cable attachment point 26 and the cable securing point 22.

In one embodiment, the horizontal distance 42 between points 26 and 24 ranges from about 0 to about 4 inches. The vertical distance 44 between these two points 26, 24 ranges from about 2 to about 6 inches. The vertical distance 46 between platform and cable securing point ranges from about 1 inch to about 1.5 inches. The horizontal distance 48 between one longitudinal edge of the contact surface and the cable securing point 22 ranges from about 1 inch to about 2 inches. The length 50 of the channel ranges from about 24 to about 60 inches while the height 52 of the channel ranges from about 1 inch to about 2 inches. The width 54 of the channel ranges from about 1 inch to about 1.5 inches.

Figure 10:
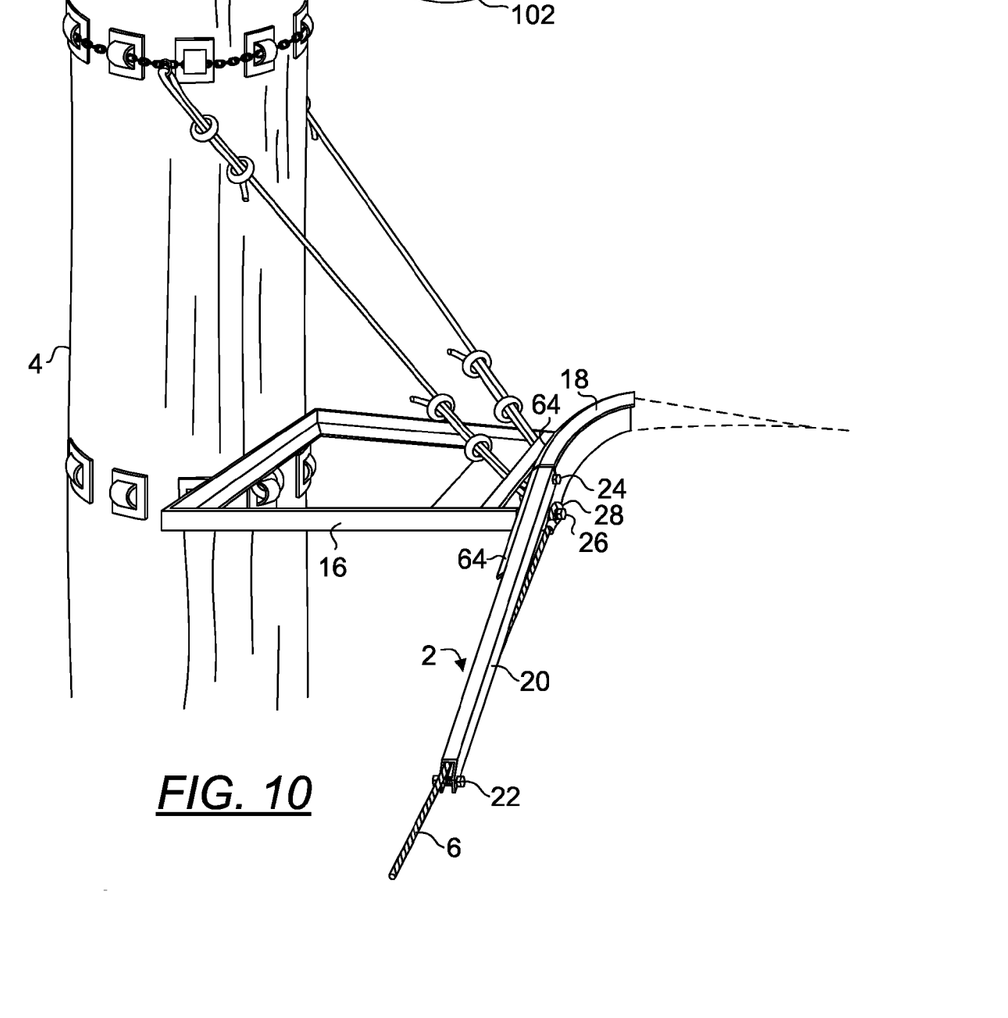
FIG. 10 is a top perspective view of an alternate embodiment of a ramp system according to the present invention, depicting a ledge configured for securing a trolley while it goes into or is in a turn.
Figure 11:
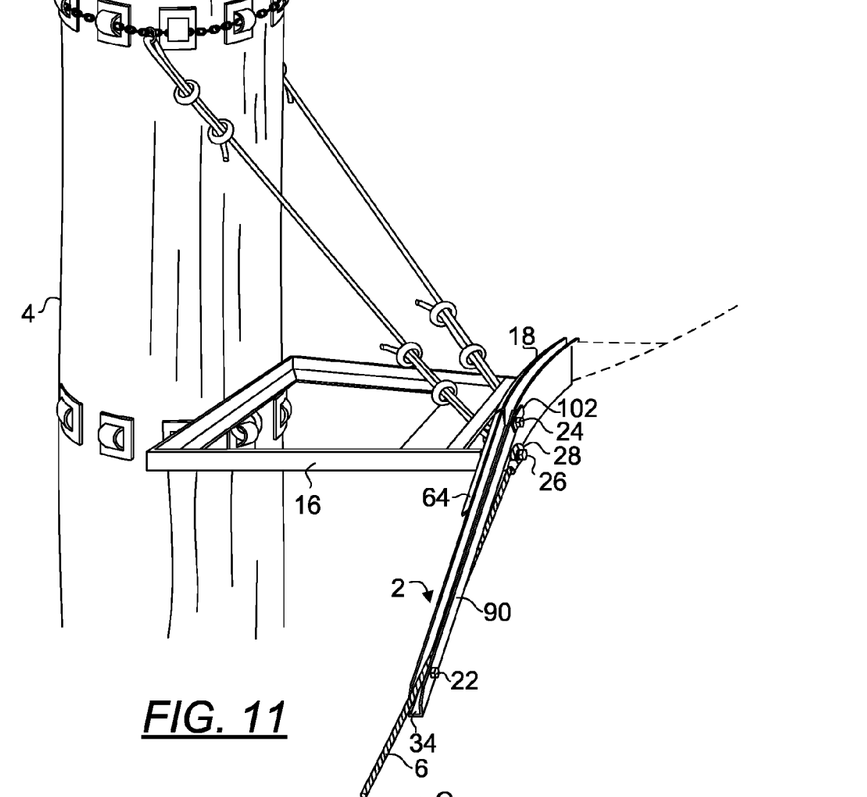
FIG. 11 is a top perspective view of a U-shaped channel according to the present ramp system, depicting a ledge configured for securing a trolley while it goes into or is in a turn.

FIG. 10 is a top perspective view of an alternate embodiment of a ramp system according to the present invention, depicting a ledge 64 that is incorporated into a portion of the inverted U-shaped channel 20 and configured for securing a trolley while the trolley goes into or is in a turn. The use of such ledge 64 may be extended to the transfer rail 18, which is especially useful if the transfer rail 18 is curved, i.e., if the momentum of the trolley changes drastically going onto the transfer rail 18 from the ramp system 2 as shown in FIG. 10. For clarity, the contact surface 34 is not shown such that the ledge 64 may be revealed. The ledge 64 is preferably disposed along at least a portion of the channel 20. In one embodiment, the Applicant discovered that the ramp system 2 may also suitably be configured from a U-shaped channel instead of an inverted U-shaped channel as previously disclosed. FIG. 11 is a top perspective view of a U-shaped channel according to the present ramp system, depicting a ledge 64 configured for securing a trolley while the trolley goes into or is in a turn.

Figure 12:
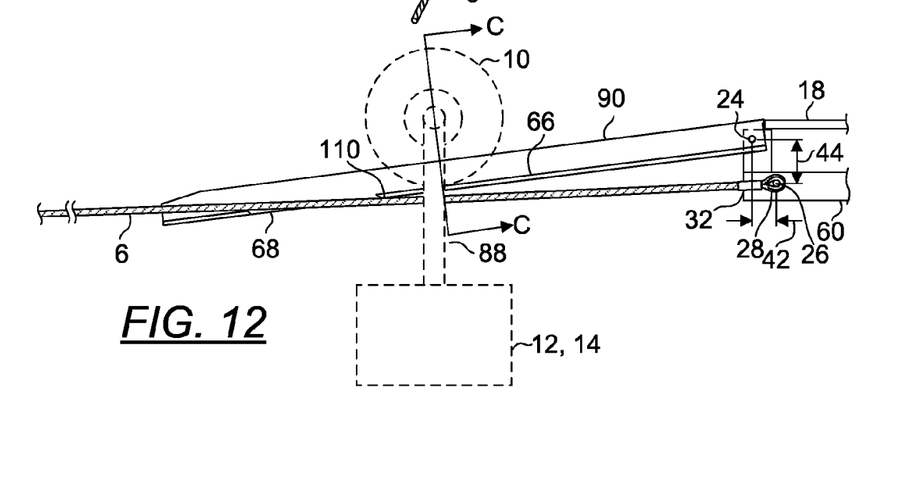
FIG. 12 is a side orthogonal view of the embodiment of FIG. 11, depicting a cable that is inserted through an opening in the bottom wall of the channel of the ramp system.
Figure 13:
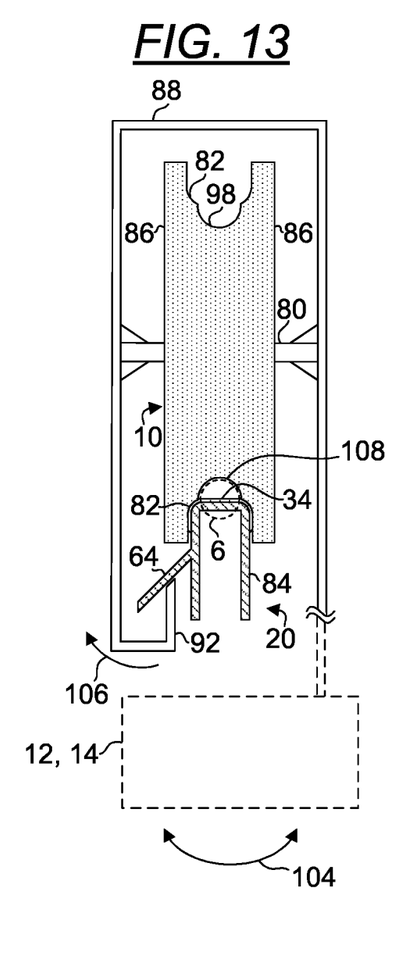
FIG. 13 is a sectional front orthogonal view of the inverted U-shaped channel as taken along B-B of FIG. 9, depicting a ledge configured for securing a trolley while it goes into or is in a turn.
Figure 14:
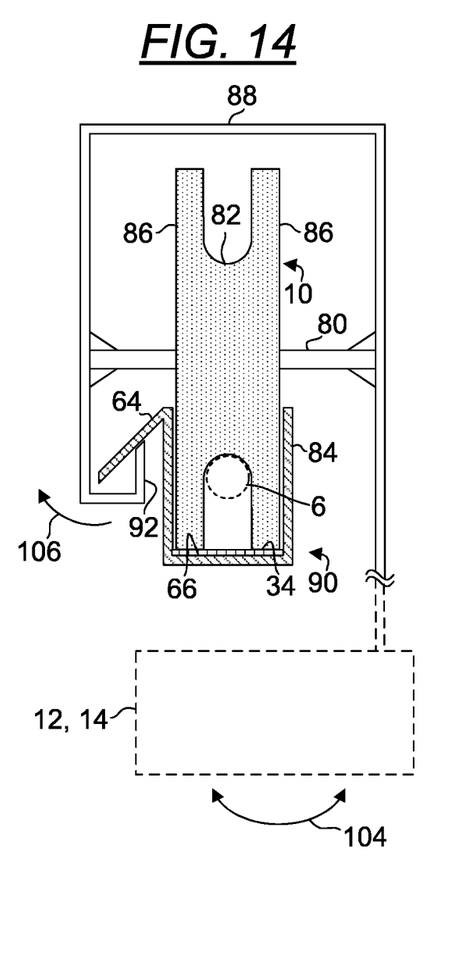
FIG. 14 is a sectional front orthogonal view of the U-shaped channel as taken along C-C of FIG. 12, also depicting a ledge configured for securing a trolley while it goes into or is in a turn.

FIG. 12 is a side orthogonal view of the embodiment of FIG. 11, depicting an opening 68 in the bottom wall 66 of the channel 90 that is configured for receiving a cable 6 which slidingly secures one end of the channel at contact point 110. Also shown is a trolley 12 having a drive wheel 10 that comes in rolling engagement on the bottom wall 66 of the channel 90. In order to more clearly show the means with which the ledge 64 is used to secure a trolley, FIG. 13 is provided to show a sectional front orthogonal view of the inverted U-shaped channel as taken along B-B of FIG. 9. FIG. 14 is a sectional front orthogonal view of the U-shaped channel 90 as taken along C-C of FIG. 12, also depicting a ledge 64 configured for securing a trolley while the trolley goes into or is in a turn. It shall be apparent from FIGS. 13 and 14 that the ledge 64 is configured to extend downwardly from a side wall 84 to create a space. The drive wheel 10 is mounted on an axle 80 which is in turn connected to a frame 88. The details of a propulsion system for the drive wheel 10 are not revealed herein as the propulsion system of a drive wheel is known to those skilled in the art. In this example, a hook 92 disposed on the frame 88 is preferably an upwardly pointing J-shaped protrusion configured to extend into the space created under the ledge 64 but remain clear from substantial interference with the bottom surface of the ledge 64 when the trolley 12 arrives at the channel 20, 90. Any tendency of the trolley 12 to dislodge from the channel 20, 90 or rotation in direction 106 is prevented by the ledge 64. In shall be noted that a drive wheel 10 of the present ramp system 2 is configured to ride on a cable, a channel or a rail. A channel is typically configured in a shape similar to a rail to avoid roughness in ride due to a channel-to-rail or rail-to-channel transition, i.e., if the cross-sectional profile of a rail is U-shaped, the cross-sectional profile of a channel is preferably U-shaped as well. For a drive wheel whose groove 82 contacts the contact surface 34 of a channel 20, the cross-sectional profile of groove 82 may also not be suitable for riding on a cable 6. In such a case, a secondary profile 108 configured in the size and shape of the top half of a cable 6 may be built into the groove 82 or drive wheel 10. In a U-shaped channel 90, as the drive wheel 10 rides atop a contact surface 34 or simply a bottom wall 66 of the channel when the drive wheel 10 is at the channel 90, the groove 82 is simply configured to accommodate a cable 6. It shall also be noted that while in use, the side walls 86 of the drive wheel 10 may contact the side walls 84 of the channel 90. However, such contact is tolerated and it serves to contain the drive wheel 10 within the space delineated by the channel 90.

Figure 15:
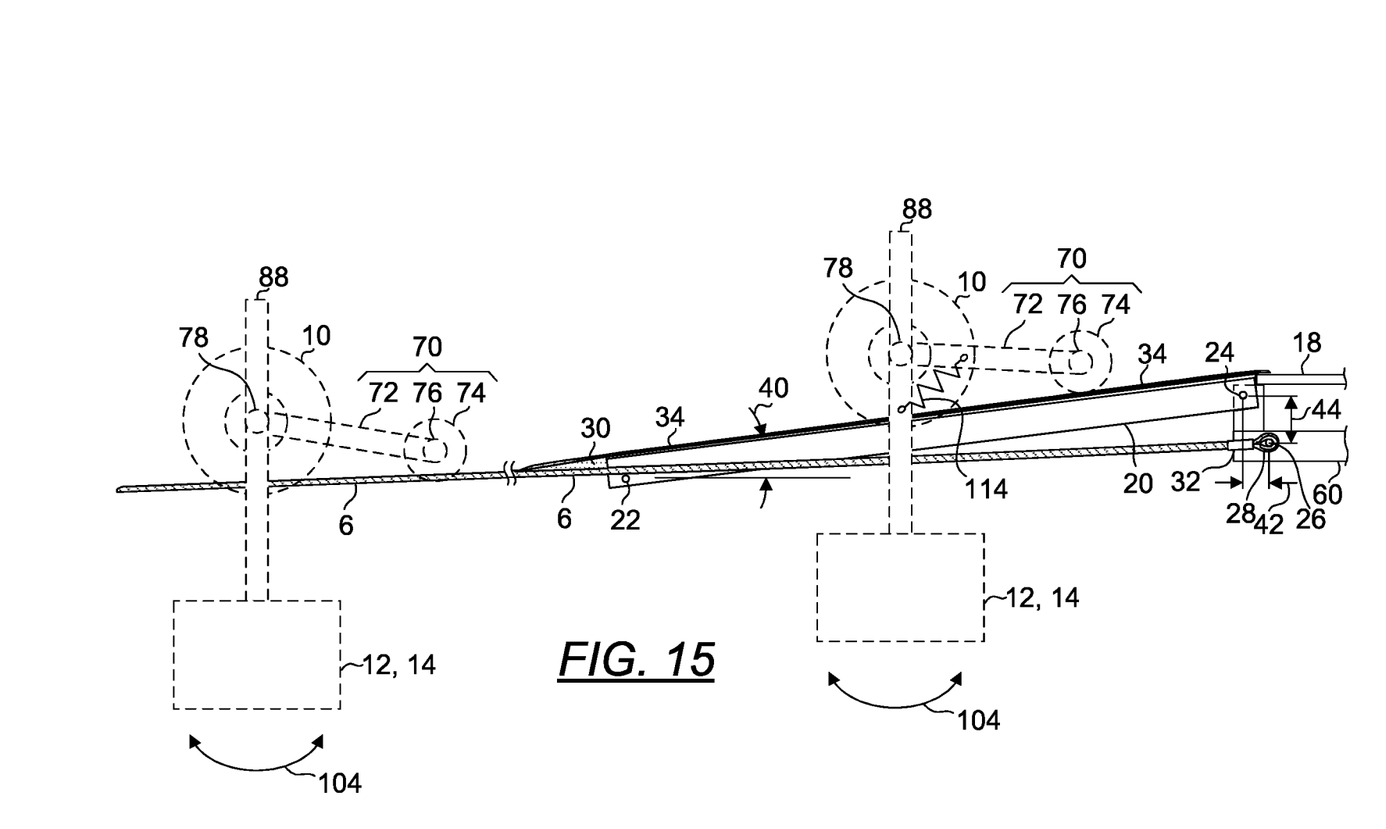
FIG. 15 depicts an embodiment of a trolley having an anti-wobble device where the trolley is shown positioned both on a cable portion and a ramp portion.
Figure 16:
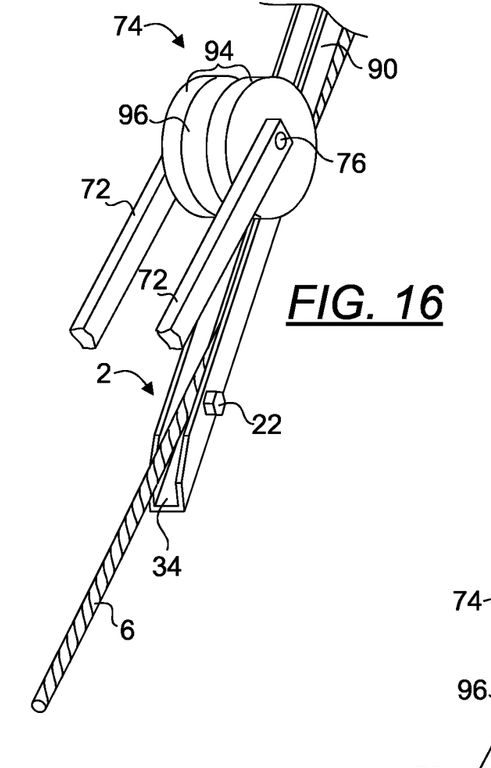
FIG. 16 depicts a portion of the anti-wobble device of FIG. 15 configured to negotiate a U-shaped ramp.
Figure 17:
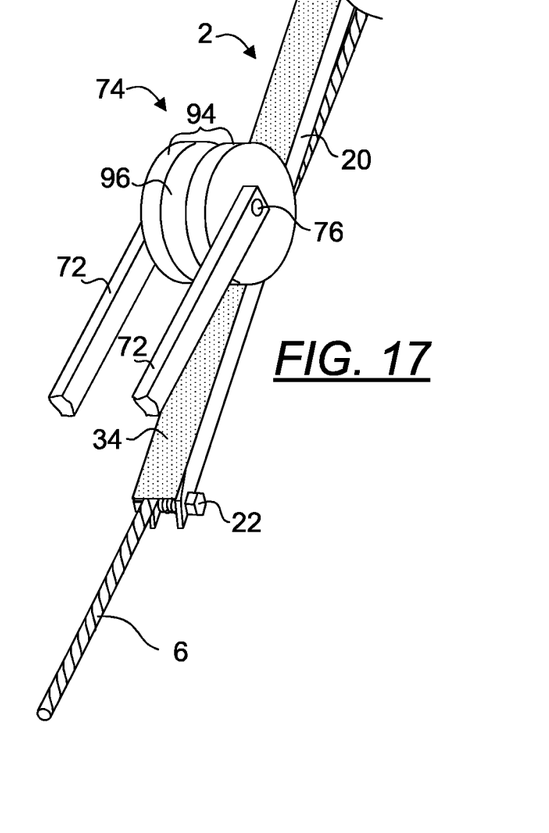
FIG. 17 depicts a portion of the anti-wobble device of FIG. 15 configured to negotiate an inverted U-shaped ramp.

FIG. 15 depicts an embodiment of a trolley having an anti-wobble device 70 where the trolley is shown positioned both on a cable portion and a ramp portion. FIGS. 16 and 17 depict a portion of the anti-wobble device 70 configured to negotiate a U-shaped ramp and an inverted U-shaped ramp, respectively. For clarity, only a portion of anti-wobble device is shown. A single drive wheel system such as one disclosed earlier, although having few parts and simple in construction, is subject to wobble or pendulum about the drive wheel's rotational axis in direction 102 (of FIG. 9) and in the direction transverse to the travel direction of the trolley (direction 104 of FIG. 15). The present anti-wobble device 70 significantly reduces wobbles in such directions while enabling the present trolley to negotiate a network of cables, channels and transfer rails. In the embodiment shown in FIG. 15, the anti-wobble device 70 includes an anti-wobble wheel 74, an elongated bar 72 having a first pivot point 78 and a second pivot point 76. An elongated bar 72 as used herein, references either one connecting bar or a pair of connecting bars that connect either a sheave or a stabilizer block to a drive wheel. The anti-wobble wheel 74 is preferably a sheave having a groove 96 centrally disposed about its circumferential periphery. The groove 96 is disposed between two outer surfaces 94. The sheave works in much the same way as the drive wheel 10 except the sheave is unpowered. The elongated bar 72 is rotatably secured at the first pivot point 78 and the anti-wobble wheel 74 is rotatably secured to the second pivot point such that the groove 82 of the drive wheel is configured to maintain rolling contact with the low tension cable 6 or the channel 20 at any time. The elongated bar 72 is configured to rotate about the first pivot point such that the anti-wobble wheel rollingly engages the low tension cable at the groove while the sheave is riding on the low tension cable and the anti-wobble wheel rollingly engages the ramp system at the two outer surfaces 94 while the sheave is riding on the channel or transfer rail.

In one embodiment, the anti-wobble device 70 exerts a downwardly trending force purely by its weight. In another embodiment, a bias force is applied to the elongated bar 72 such that it tends to rotate downwardly and towards the frame 88. An example of such application of a bias force is provided by a tension spring 114 attached at its ends to the elongated bar 72 and the frame 88 in addition to the weight of the anti-wobble device. This bias force prevents the sheave from being accidentally removed from contact with the cable on which its rides. In another embodiment, a shock absorber or dampening spring may additionally be used in conjunction with the tension spring to cushion vibrations due to any cable-ramp, ramp-rail or ramp-cable transitions and the like.

Figure 18:
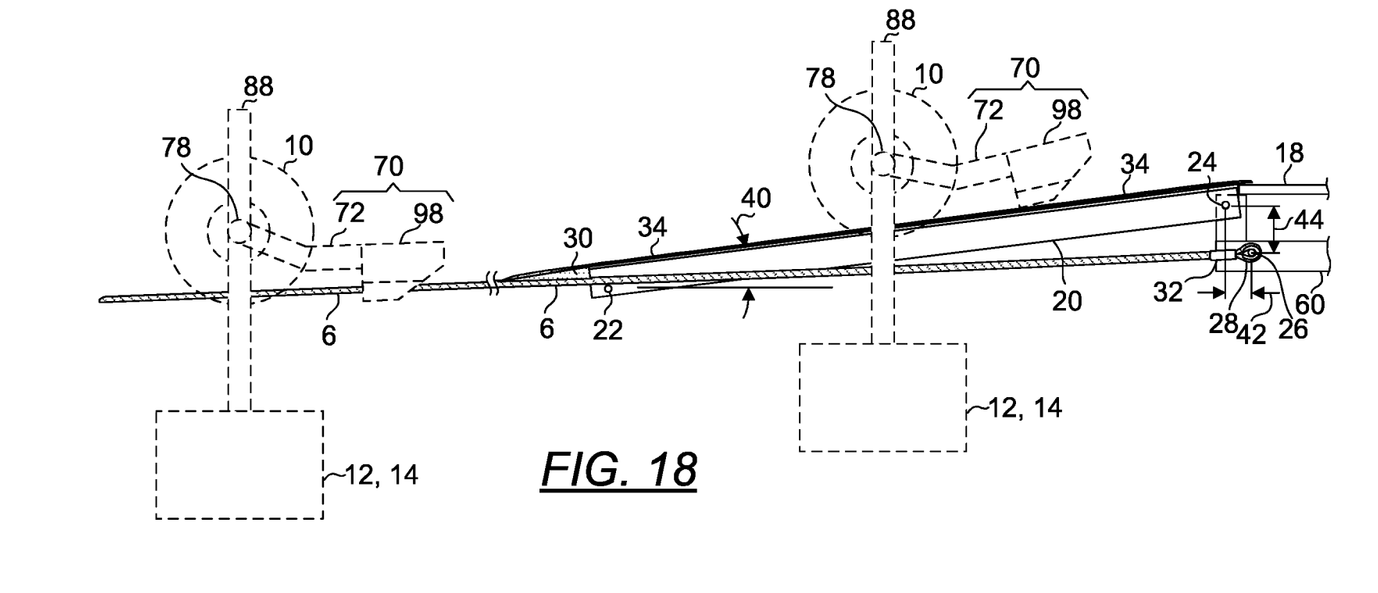
FIG. 18 depicts another embodiment of a trolley having an anti-wobble device where the trolley is shown positioned both on a cable portion and a ramp portion.
Figure 19:
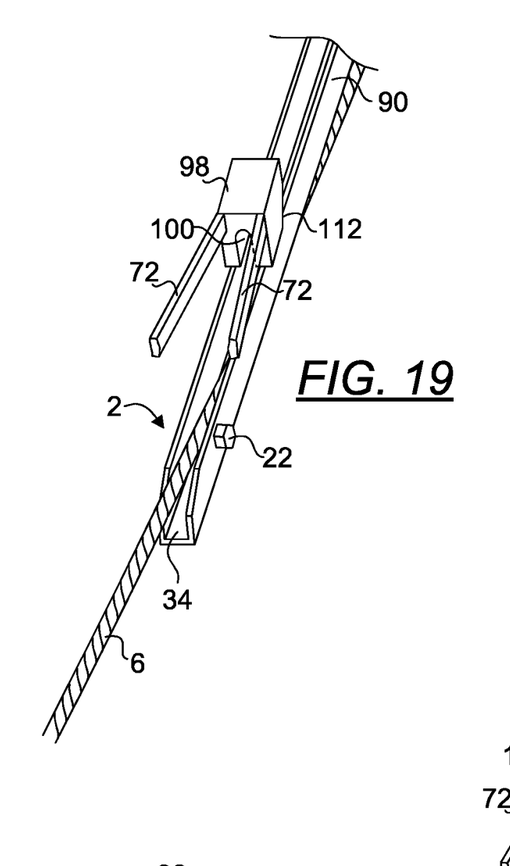
FIG. 19 depicts a portion of the anti-wobble device of FIG. 18 configured to negotiate a U-shaped ramp.
Figure 20:
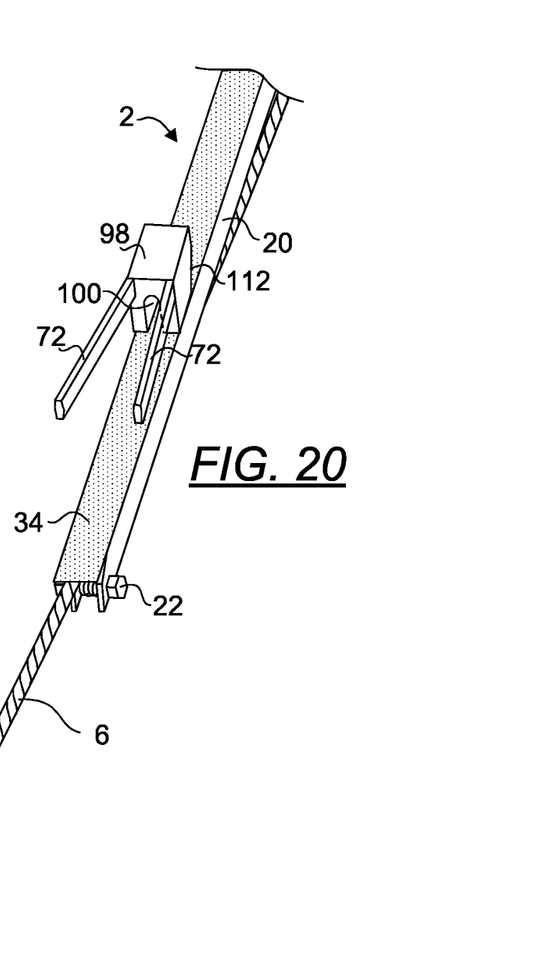
FIG. 20 depicts a portion of the anti-wobble device of FIG. 18 configured to negotiate an inverted U-shaped ramp.
Figure 21:
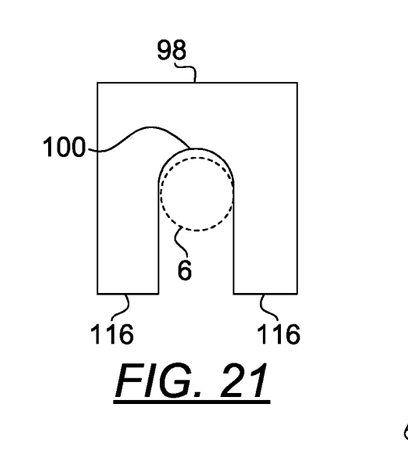
FIG. 21 is a front orthogonal view of a stabilizer block of FIG. 18, depicting its relationship to a cable.

FIG. 18 depicts another embodiment of a trolley having an anti-wobble device 70 where the trolley is shown positioned both on a cable portion and a ramp portion. FIGS. 19 and 20 depict a portion of the anti-wobble device 70 of FIG. 18 configured to negotiate a U-shaped ramp and an inverted U-shaped ramp, respectively. Again, for clarity, only a portion of the anti-wobble device 70 is shown. FIG. 21 is a front orthogonal view of a stabilizer block of FIG. 18, depicting its relationship to a cable 6. In this embodiment, the anti-wobble device comprises a stabilizer block 98 and an elongated bar 72 having a first pivot point 76 and a second end. The stabilizer block 98 includes a block having a groove 100 centrally disposed about a surface of the block and between two outer surfaces 116. The elongated bar 72 is rotatably secured to the first pivot point 78 and the stabilizer block 98 is secured to the second end such that the groove of the drive wheel 10 is configured to maintain rolling contact with the low tension cable 6 or the channel 20, 90 at any time. While traveling on a cable 6, the stabilizer block 98 slidingly engages the cable 6 with its groove 100, providing additional support to the frame 88. As the stabilizer block 98 moves forward from cable contact to channel contact, the slanted surface 112 of the stabilizer block 98 first strikes the starter ramp 30 or the channel 20, 90, causing the elongated bar 72 to rotate about the first pivot point 78 and lifting the stabilizer block 98 above the channel 20, 90 such that the stabilizer block 98 slidingly engages the channel 20, 90 at the two outer surfaces 116 and again providing additional support to the frame 88.

The stabilizer block 98 is preferably constructed from a slippery plastic material, e.g., polytetrafluoroethylene (PTFE), nylon, ultra high molecular weight (UHMW) polypropylene or high density wood or aluminum.

I claim:
1. A ramp system for reducing an approach angle of one end of a low tension cable at a first point at a first level, said ramp system comprises:
   (a) an elongated channel having a contact surface, a proximal end and a distal end, wherein said distal end is disposed atop and contacts a portion of said cable; and
   (b) an anchor configured to pivotably support said proximal end of said channel at a second point at a second level, wherein said second level is disposed higher than said first level,
   wherein said distal end of said elongated channel is slideably but positively secured to said portion of said cable and said first point, said second point and said distal end are configured to cooperate to form a triangular relationship, thereby reducing bending in said cable, reducing said approach angle and reducing fatigue exerted on said channel and said cable.

2. The ramp system of claim 1, wherein said elongated channel comprises an inverted U-shaped cross-sectional profile.

3. The ramp system of claim 1, wherein said elongated channel comprises an inverted V-shaped cross-sectional profile.

4. The ramp system of claim 1, wherein said elongated channel comprises a U-shaped cross-sectional profile.

5. The ramp system of claim 1, wherein said contact surface is constructed from a material selected from a group consisting of aluminum, polyurethane, polyethylene and bonded rubber, epoxy and sand mixture.

6. The ramp system of claim 1, wherein said distal end of said elongated channel is constructed from a material having a lower hardness index than said cable.

7. The ramp system of claim 1, further comprising a drive wheel of a self propelled trolley, wherein said drive wheel comprises a primary groove disposed about the circumferential periphery of said drive wheel and said primary groove comprises a contact surface with said cable, said contact surface having a hardness index less than that of said cable where said contact surface is configured to increase traction of said drive wheel with said cable and to reduce abrasion to said cable.

8. The ramp system of claim 7, wherein said drive wheel further comprises a secondary groove disposed about the circumferential periphery of said primary groove, wherein said secondary groove is configured to accommodate the cross-sectional shape and size of said cable.

9. The ramp system of claim 7, further comprising a ledge disposed along at least a portion of said elongated channel, said ledge is configured for engagement with a hook connected to the trolley to prevent said drive wheel from derailing from said elongated channel.

10. The ramp system of claim 7, further comprising:
an anti-wobble device comprising an anti-wobble wheel and an elongated bar having a first pivot point and a second pivot point, wherein said anti-wobble wheel includes a sheave having a groove centrally disposed about its circumferential periphery, wherein said groove is disposed between two outer surfaces,
wherein said elongated bar is rotatably secured at said first pivot point and said anti-wobble wheel is rotatably secured to said second pivot point such that said groove of said drive wheel is configured to maintain rolling contact with said cable or said elongated channel at any time and said elongated bar is configured to rotate about said first pivot point such that said anti-wobble wheel is configured to rollingly engage said cable at said groove of said sheave and said anti-wobble wheel is configured to rollingly engage said elongated channel at said two outer surfaces.

11. The ramp system of claim 7, further comprising:
an anti-wobble device comprising a stabilizer block having a groove centrally disposed about a surface of said stabilizer block and between two outer surfaces and an elongated bar having a first pivot point and a second end, wherein said elongated bar is rotatably secured at said first pivot point and said stabilizer block is secured to said second end such that said groove of said drive wheel is configured to maintain rolling contact with said cable or said elongated channel at any time and said elongated bar is configured to rotate about said first pivot point such that said stabilizer block is configured to slidingly engage said cable at said groove of said stabilizer block and said stabilizer block is configured to slidingly engage said elongated channel at said two outer surfaces.

12. The ramp system of claim 11, wherein said stabilizer block is constructed from a material selected from a group consisting of polytetrafluoroethylene (PTFE), nylon, ultra high molecular weight (UHMW) polypropylene, high density wood and aluminum.

13. An anti-wobble device for reducing wobbling of a trolley, wherein the trolley includes a drive wheel having a primary groove disposed about the circumferential periphery of the drive wheel, the drive wheel is configured to ride on a cable or an elongated channel, said anti-wobble device comprising:
(a) a stabilizer block comprising a groove centrally disposed about a surface of said block and between two outer surfaces; and
(b) an elongated bar having a first pivot point and a second end,
wherein said elongated bar is rotatably secured at said first pivot point to said trolley and said stabilizer block is secured to said second end such that said primary groove of said drive wheel is configured to maintain rolling contact with said cable or said elongated channel at any time and said elongated bar is configured to rotate about said first pivot point such that said stabilizer block is configured to slidingly engage said cable at said groove of said stabilizer block and said stabilizer block is configured to slidingly engage the elongated channel at said two outer surfaces.

14. The anti-wobble device of claim 13, wherein said elongated channel comprises:
(a) a contact surface, a proximal end and a distal end, wherein said distal end is disposed atop and contacts a portion of said cable; and
(b) an anchor configured to pivotably support said proximal end of said elongated channel at a second point at a second level, wherein said second level is disposed higher than said first level,
wherein said distal end of said elongated channel is slideably but positively secured to said portion of said cable and said first point, said second point and said distal end are configured to cooperate to form a triangular relationship, thereby reducing bending in said cable, reducing said approach angle and reducing fatigue exerted on said elongated channel and said cable.

15. The anti-wobble device of claim 13, wherein said elongated channel comprises an inverted U-shaped cross-sectional profile.

16. The anti-wobble device of claim 13, wherein said elongated channel comprises a U-shaped cross-sectional profile.

17. The anti-wobble device of claim 13, wherein said distal end of said elongated channel is constructed from a material having a lower hardness index than said cable.

18. The anti-wobble device of claim 13, wherein said primary groove of said drive wheel comprises a contact surface with said cable having a hardness index less than that of said cable where said contact surface is configured to increase traction of said drive wheel with said cable and reduce abrasion to said cable.

19. The anti-wobble device of claim 13, wherein said drive wheel further comprises a secondary groove disposed about the circumferential periphery of said primary groove, wherein said secondary groove is configured to accommodate the cross-sectional shape and size of said cable.

20. The anti-wobble device of claim 13, further comprising a ledge disposed along at least a portion of said elongated channel, said ledge is configured for engagement with a hook connected to said trolley to prevent said drive wheel from derailing from said elongated channel.

\* \* \* \* \*